United States Patent [19]

Hall

[11] Patent Number: 5,796,639

[45] Date of Patent: Aug. 18, 1998

[54] METHOD AND APPARATUS FOR VERIFYING THE INSTALLATION OF STRAPPING DEVICES ON A CIRCUIT BOARD ASSEMBLY

[75] Inventor: Jerald N. Hall, Scappoose, Oreg.

[73] Assignee: Intel Corporation, Santa Clara, Calif.

[21] Appl. No.: 778,305

[22] Filed: Jan. 2, 1997

Related U.S. Application Data

[63] Continuation-in-part of Ser. No. 715,857, Sep. 19, 1996.

[51] Int. Cl.$^6$ ............................................ G01R 31/28
[52] U.S. Cl. .................... 364/579; 371/22.1; 371/22.6; 395/183.01
[58] Field of Search ................... 364/579, 571.04, 364/580; 371/21.1, 22.1, 22.6, 48; 395/180, 183.01, 183.07, 183.12, 183.13, 183.21; 439/43, 507, 330, 525; 307/38, 112; 326/16, 37

[56] References Cited

U.S. PATENT DOCUMENTS

| | | | |
|---|---|---|---|
| 4,070,565 | 1/1978 | Borrelli | 235/302 |
| 4,178,542 | 12/1979 | McCarthy | 324/51 |
| 4,196,386 | 4/1980 | Phelps | 324/73 PC |
| 4,212,075 | 7/1980 | Cleversey et al. | 364/580 |
| 4,261,041 | 4/1981 | Starr | 364/571 |
| 4,459,693 | 7/1984 | Prang et al. | 371/20 |
| 4,656,632 | 4/1987 | Jackson | 371/20 |
| 5,161,102 | 11/1992 | Griffin et al. | 395/800 |
| 5,243,274 | 9/1993 | Kelsey et al. | 324/158 R |
| 5,250,908 | 10/1993 | Liu et al. | 324/542 |
| 5,276,832 | 1/1994 | Holman, Jr. | 395/425 |
| 5,287,531 | 2/1994 | Rogers, Jr. et al. | 395/800 |
| 5,297,101 | 3/1994 | Tada et al. | 365/230.01 |
| 5,440,181 | 8/1995 | Gruender, Jr. et al. | 307/156 |
| 5,563,526 | 10/1996 | Hastings et al. | 326/37 |
| 5,600,788 | 2/1997 | Lofgren et al. | 395/183.07 |
| 5,680,407 | 10/1997 | DeJong | 371/22.3 |

*Primary Examiner*—James P. Trammell
*Assistant Examiner*—Patrick Assouad
*Attorney, Agent, or Firm*—Blakely, Sokoloff, Taylor & Zafman

[57] ABSTRACT

An apparatus for verifying the installation of strapping devices on a circuit board assembly includes a plurality of strapping devices coupled to a plurality of configurable devices, an output port coupled to the plurality of strapping devices, and a plurality of input ports, coupled to the plurality of strapping devices with a corresponding first plurality of traces each having an associated pull-up resistor tied to a positive voltage level. The output port is adapted to output electrical signals of a first state at a first time and a second state at a second time to each of the plurality of strapping devices. The plurality of input ports receive the associated output signal from the plurality of strapping devices at each of the first time and the second time via the corresponding first plurality of traces, wherein unconfigured or malfunctioning ones of the plurality of strapping devices are identified.

17 Claims, 3 Drawing Sheets

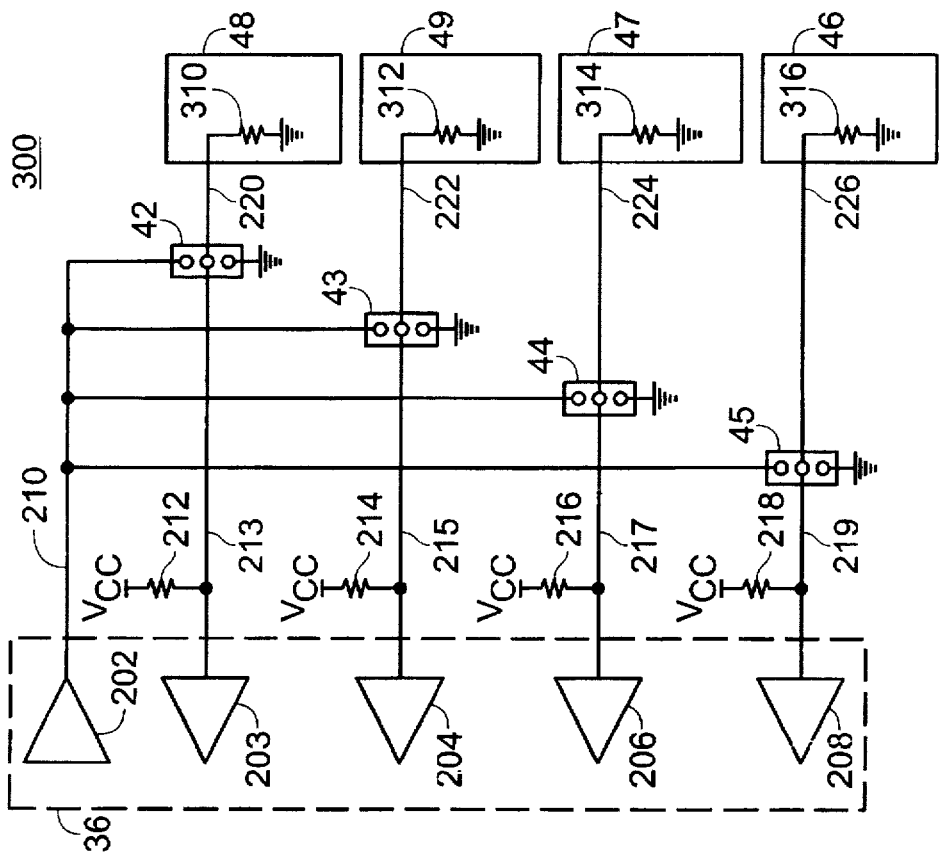
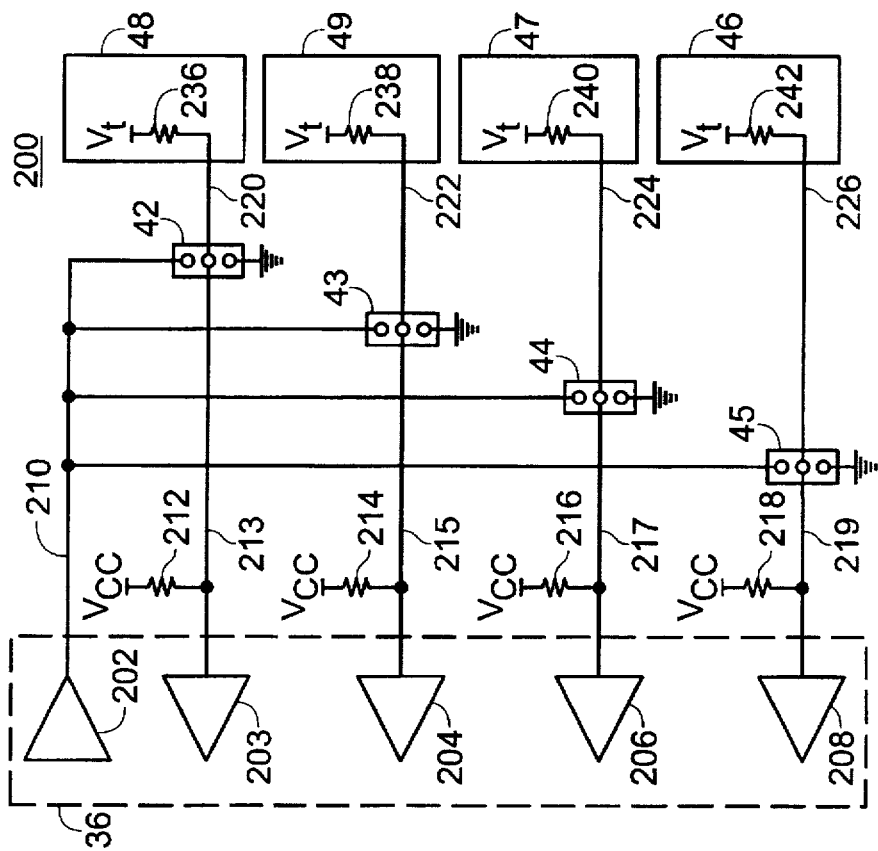

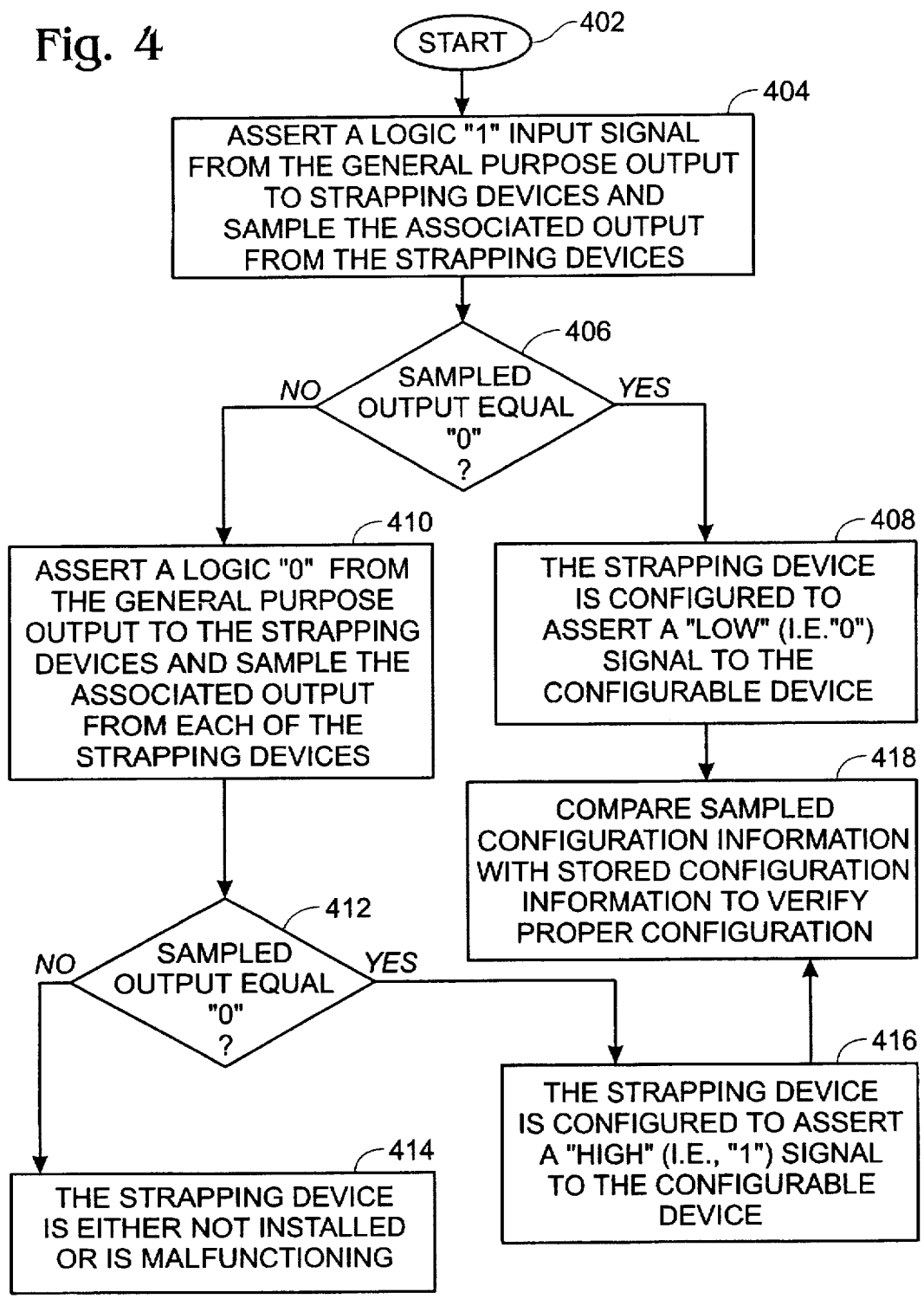

METHOD AND APPARATUS FOR VERIFYING THE INSTALLATION OF STRAPPING DEVICES ON A CIRCUIT BOARD ASSEMBLY

RELATED APPLICATIONS

This application is a continuation-in-part of copending application Ser. No. 08/715,857 filed on Sep. 19, 1996, for a Method and Apparatus for the Non-invasive Testing of a Printed Circuit Board Assembly, by Jerald N. Hall, inventor of the present application, and commonly assigned to the assignee of this application.

BACKGROUND OF THE INVENTION

1. Field of the Invention

The present invention relates to the field of computer systems and, in particular, to a method and apparatus for verifying the installation of strapping devices on a circuit board assembly.

2. Background Information

Recognizing that "one size does not fit all" in the computer industry, many computer system manufacturers offer a wide variety of computer systems to satisfy a variety of markets and budgets. While such variety makes personal computers available to a wider spectrum of consumers, the same product variety adds complexity to the manufacturing process which, when left unaddressed, may well result in quality and efficiency problems.

In an effort to improve efficiency and alleviate quality problems associated with the circuit board assembly process, many manufacturers have determined that it is more cost effective to settle on a few circuit board assembly "platforms". These platforms are essentially the same, or very similar, circuit board assemblies populated with similar components, wherein the operating characteristics of the circuit board assembly are determined by manually setting strapping devices to configure the configurable devices of the circuit board assembly. This manual setting of the strapping devices selectively configures a circuit board assembly "platform" into a particular genre of circuit board assembly (i.e., a circuit board assembly suitable for a particular use/product). In other words, the selective configuration of strapping devices configures an otherwise generic circuit board assembly with the "personality" characteristics (i.e., operating characteristics) commonly associated with a specific product. On, for example, computer system motherboards, strapping devices are often used to configure a clock source to supply a particular system bus clock frequency, or to indicate bus/core ratio (i.e., a the ratio of the bus clock frequency to the processor clock frequency) configuration information. Jumper blocks, dual-inline package (DIP) switches, double-pole single-throw (DPST) switches are but a few examples of strapping devices which are configured to select the operating configuration on a circuit board assembly.

Although the concept of the selective configuration of a generic circuit board assembly with strapping devices has indeed improved some of the efficiency problems, it has not eliminated the quality concerns and, in fact, may have introduced new quality issues. For example, many of the prior art strapping devices are manually placed on the circuit board assembly in the manufacturing process, which is prone to human error. The misconfiguration of a circuit board assembly (i.e., the configuration of a strapping device which is inconsistent with the operating characteristics of a processor module) may well result in diminished performance or catastrophic failure for the consumer.

Prior art test methods have not proven to be completely effective in verifying the installation and configuration of these strapping devices. An improved method and apparatus for the non-invasive testing of a circuit board assembly was disclosed the above identified copending parent application. However, many modem configurable devices incorporate internal pull-up or pull-down resistors on the configuration input coupled to the strapping device. The incorporation of the pull-up/pull-down resistors in these modern configurable devices may well result in a false determination that a strapping device is installed in either a "high" (i.e., a logic 1) configuration indicative of an internal pull-up resistor, or a "low" (i.e., logic 0) configuration indicative of an internal pull-down resistor.

Thus a need exists for a method and apparatus for verifying the installation of strapping devices on a circuit board assembly wherein the strapping device is coupled to a configurable device having internal pull-up or pull-down resistors tied to the configuration input.

SUMMARY OF THE INVENTION

In accordance with the teachings of the present invention, a method and apparatus for verifying the installation of strapping devices on a circuit board assembly is presented. In one embodiment, an apparatus for verifying the installation of strapping devices on a circuit board assembly includes a plurality of strapping devices coupled to a plurality of configurable devices, an output port coupled to the plurality of strapping devices, and a plurality of input ports, coupled to the plurality of strapping devices with a corresponding first plurality of traces each having an associated pull-up resistor tied to a positive voltage level. The output port is adapted to output electrical signals of a first state at a first time and a second state at a second time to each of the plurality of strapping devices. The plurality of input ports receive the associated output signal from the plurality of strapping devices at each of the first time and the second time via the corresponding first plurality of traces, wherein unconfigured or malfunctioning ones of the plurality of strapping devices are identified.

In one embodiment, the output port is a general purpose input/output port configured as an output port, while the plurality of input ports is a general purpose input/output port configured as an input port. The configurable device contains internal pull-up or pull-down resistors coupling the configurable device to the trace, such that without the teachings of the present invention, the testing of the strapping device might well result in an incorrect test result.

BRIEF DESCRIPTION OF THE DRAWINGS

The present invention will be described by way of exemplary embodiments, but not limitations, illustrated in the accompanying drawings in which like references denote similar elements, and in which:

FIG. 2 is a circuit diagram illustrating a circuit for verifying the installation of a strapping device when coupled to a device containing a pull-up resistor, in accordance with one embodiment of the present invention;

FIG. 3 is a circuit diagram illustrating a circuit for verifying the installation of a strapping device when coupled to a device containing a pull-down resistor, in accordance with one embodiment of the present invention; and FIG. 4 is a flow chart illustrating the method steps for verifying the installation of a strapping device when coupled to a configurable device, in accordance with one embodiment of the present invention.

DETAILED DESCRIPTION

Figure 1:
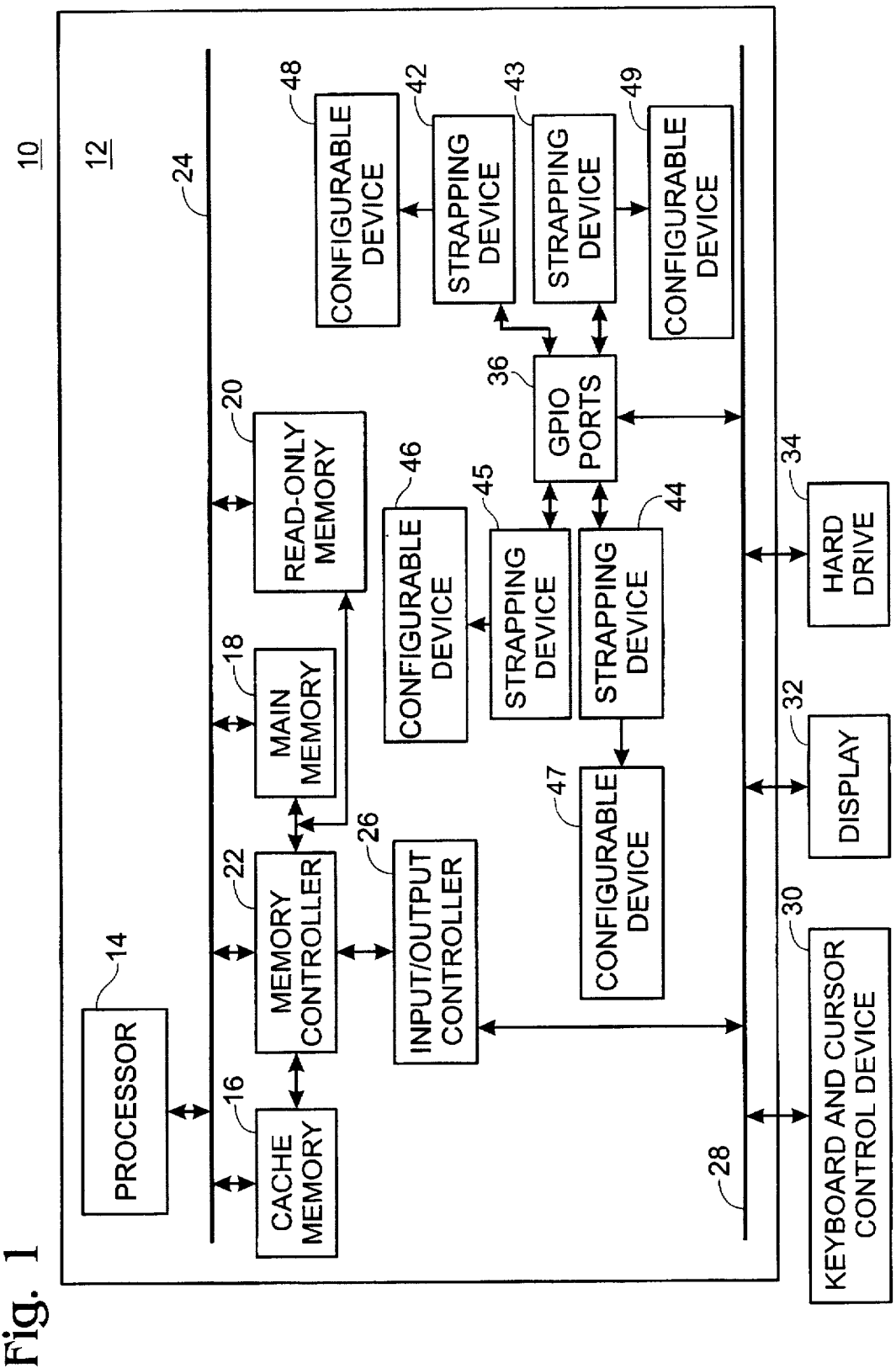
FIG. 1 is a block diagram illustrating an exemplary computer system incorporating the teachings of the present invention.

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as necessarily order dependent in their performance.

Referring now to FIG. 1, a block diagram illustrating an exemplary computer system 10 incorporating the teachings of the present invention is shown. As depicted in FIG. 1, exemplary computer system 10 includes processor 14, cache memory 16, main memory 18, read-only memory 20, memory controller 22, and processor bus 24 coupled to each other as depicted. Read-only memory 20 includes a set of basic input/output services (BIOS) (not shown) including start-up processes which, in one embodiment, verify the installation of strapping devices within computer system 10 using a method and apparatus as further described in FIGS. 2, 3 and 4. Additionally, computer system 10 includes an input and output (I/O) controller 26, a general purpose input and output (GPIO) device 36, a plurality of strapping devices 42, 43, 44, and 45 correspondingly coupled to a plurality of configurable devices 46, 47, 48 and 49 as shown. I/O bus 28, keyboard and cursor control device 30, display 32, and hard drive 34 coupled to each other and the above enumerated elements as depicted. In one embodiment, elements 14–28 and 36–49 are disposed on a printed circuit board (e.g., motherboard) 12.

In addition to the system BIOS, read-only memory 20 may also store system configuration information (not illustrated). The system configuration information is a summary listing of the operating configuration information for exemplary computer system 10. In particular, the system configuration information may contain such information as processor speed, bus/core ratio information, grade and access time for the main memory 18, and information relating to the desired settings for the plurality of strapping devices 42–45.

However, the system configuration information need not be stored in read-only memory 20, but may be available in any other memory storage device. Except for verifying the installation of strapping device 42, elements 12–49 perform their respective conventional function as known in the art, and may be implemented in any of a number of conventional techniques known to those skilled in the art. In fact, exemplary computer system 10 is intended to represent a broad category of computer systems.

Turning now to FIG. 2, a circuit diagram illustrating a circuit for verifying the installation of a strapping device, in accordance with the teachings of the present invention is shown. As depicted, the circuit includes general purpose input and output (GPIO) device 36 having a general purpose output 202 and a plurality of general purpose inputs 203, 204, 206 and 208 (i.e., input ports) coupled to a corresponding plurality of strapping devices 42, 43, 44, and 45 with traces 213, 215, 217 and 219 each having a pull-up resistor 212, 214, 216 and 218 tied to a positive voltage level. In addition to the plurality of general purpose inputs 203–208, strapping devices 42–45 are also coupled to a plurality of configurable devices 46, 47, 48 and 49. In one embodiment, strapping devices 42–45 are coupled to configurable devices 46–49 via an input pin on each of configurable devices 46–49, wherein the input pin on each of the configurable devices 46–49 is tied to a positive logic level via an internal pull-up resistor 236–242. In one embodiment, the GPIO device 36 is a National Semiconductor Super I/O™ Enhanced Sidewinder Lite, part number PC87307VUL/PC87308VUL commonly available from National Semiconductor in Sunnyvale, Calif.

As depicted general purpose output 202 of GPIO device 36 is coupled to each of the strapping devices 42, 43, 44, and 45 with trace 210. In addition, strapping devices 42, 43, 44, and 45 are also coupled to the plurality of general purpose inputs 203, 204, 206 and 208 of GPIO device 36 via traces 213, 215, 217 and 219, each of which having pull-up resistor 212, 214, 216 and 218 tied to a positive voltage level (e.g., Vcc).

The operation of the circuit of FIG. 2 will be illustrated with further reference to FIG. 4. The system begins, in step 402 with a request to verify the integrity and operating state of a strapping device 42–45 received by GPIO device 36. In step 404, a first electrical signal at a positive potential (i.e., a logic '1') is output on trace 210, by way of general purpose output 202, to each of the plurality of strapping devices 42–45. While the general purpose output 202 outputs the first signal, the associated output of the plurality of strapping devices 42–45 is sampled via traces 213, 215, 217, 219, and by way of the plurality of input ports 203, 204, 206 and 208. In step 406, the sampled associated output for each of the plurality of strapping devices 42–45 is analyzed to determine if any of the sampled associated output of the strapping devices is at ground potential (i.e., a logic level '0'). If so, in step 408, the system concludes that those strapping devices with a sampled associated output of a logic '0' are configured to assert a logic '0' to the corresponding configurable device.

With continued reference to FIGS. 2 and 4, the method continues where, in step 410, a second electrical signal at ground potential (i.e., a logic '0') is output on trace 210, by way of general purpose output 202, to each of the plurality of strapping devices 42–45. While the second electrical signal is output by way of general purpose output 202, the associated output of the plurality of strapping devices 42–45 is sampled via traces 213, 215, 217, 219, and by way of the plurality of input ports 203, 204, 206 and 208. In step 412, the sampled associated output from each of the plurality of strapping devices 42–45 is analyzed to determine if any of the output is at a ground potential (i.e., logic level '0'). For those strapping devices of the plurality of strapping devices 42–45 with a sampled associated output at ground potential, it is concluded, in step 416, that the strapping device is configured to assert a positive potential (i.e., logic level '1').

Alternatively, for those strapping devices of the plurality of strapping devices 42–45 with a sampled associated of a positive potential, despite the second signal injected at ground potential, it is concluded that the sampled associated output of a positive potential is the result of the pull-up resistor (i.e., pull-up resistor 212, 214, 216 or 218) tied to a positive voltage level, in step 414. Thus, it is determined that those strapping devices with an associated output of a positive potential are not configured.

Returning to steps 408 and 416 of FIG. 4, for each functional strapping device of the plurality of strapping devices 42–45 the system subsequently verifies, in step 418, that the strapping device 42–45 is appropriately configured by comparing the sampled associated output for each of the strapping devices with system configuration information (not shown). As alluded to earlier, the system configuration information may be maintained in a number of alternative memory locations such as, for example, non-volatile read-only memory 20, or hard drive 34 of exemplary computer system 10, or a remote memory or mass storage location (not shown) accessed via a network connection (not shown).

Turning now to FIG. 3, a circuit diagram for verifying the integrity and operating configuration of a circuit board assembly is illustrated. In particular, the distinguishing difference between circuit 300 of FIG. 3 and circuit 200 of FIG. 2 is that the configurable devices 46–49 of FIG. 3 have pull-down resistors 310–316 tied to ground rather than the pull-up resistors 236–242 of FIG. 2. However, due to the addition of pullup resistors 212, 214, 216 and 218, the verification of the configuration of strapping devices 42–45 in accordance with the method steps of FIG. 4 is equally applicable to circuit 300 as to circuit 200, without regard to whether the configurable devices 46–49 contain pull-up resistors 236–242, pull-down resistors 310–316, or no internal pull-up/pull-down resistors at all, so long as the pull-up resistors chosen are sufficient to overcome the bias of the internal pull-down resistors of the configurable device.

Thus, a method and apparatus for verifying the installation of strapping devices on a circuit board assembly has been described. While the method and apparatus of the present invention has been described in terms of the above illustrated embodiments, those skilled in the art will recognize that the invention is not limited to the embodiments described. For example, in step 404 of FIG. 4, rather than asserting a first signal at a positive potential, the general purpose output 202 may be allowed to simply float (i.e., no output), wherein associated output from each of the plurality of strapping devices is sampled and the process continues as depicted. Further, it is envisioned that the method illustrated in FIG. 4 could be incorporated into the system start-up (i.e. boot) process controlled by the system BIOS or, alternatively, incorporated into a third-party software utility used to verify the integrity and operating configuration of a circuit board assembly. Thus, the present invention can be practiced with modification and alteration within the spirit and scope of the appended claims. Accordingly, the descriptions thereof are to be regarded as illustrative instead of restrictive on the present invention.

What is claimed is:

1. An apparatus comprising:

a plurality of strapping devices for configuring a plurality of configurable devices, wherein the plurality of strapping devices are selectively configurable into a plurality of configuration positions, each of the plurality of configuration positions having an associated output signal;

an output port, coupled to the plurality of strapping devices, and adapted to output electrical signals of a first state at a first time and a second state at a second time to the plurality of strapping devices;

a plurality of input ports, for receiving the associated output signal at each of the first time and second time; and a first plurality of traces each having an associated pull-up resistor tied to a positive voltage level for coupling the plurality of strapping devices to the plurality of input ports, wherein unconfigured or malfunctioning ones of the plurality of strapping devices are identified.

2. The apparatus of claim 1, further comprising a second plurality of traces correspondingly coupling an output of each of the plurality of strapping devices to an input of each of the plurality of configurable devices.

3. The apparatus of claim 2, wherein the input of each of the plurality of configurable devices is biased to a particular logic level with either an internal pull-up or a pull-down resistor.

4. The apparatus of claim 1, the apparatus further comprises logic for sampling, at the first time and the second time, the associated output received from each of the plurality of strapping devices at the plurality of input ports via the corresponding first plurality of traces.

5. The apparatus of claim 4, wherein configuration of each strapping device of the plurality of strapping devices is determined by analyzing the first and second sampled associated outputs, wherein a variable associated output signifies a configured strapping device, while a constant associated output signifies an unconfigured strapping device.

6. The apparatus of claim 4, wherein proper configuration of each functional ones of the plurality of strapping devices is verified by comparing the associated output against system configuration information.

7. The apparatus of claim 1, wherein the plurality of strapping devices are jumper assemblies.

8. The apparatus of claim 1, wherein configuration of each of the strapping devices is determined by analyzing the associated output received on the corresponding one of the second plurality of traces, wherein a constant associated output signifies an unconfigured strapping device, while a variable associated output signifies a configured strapping device.

9. The apparatus of claim 8, wherein proper configuration of each functional ones of the plurality of strapping devices is determined by comparing the associated output against system configuration information.

10. The apparatus of claim 1, wherein the plurality of strapping devices are dual-inline package (DIP) switches.

11. A circuit board assembly including a plurality of strapping devices selectively configurable into a plurality of configuration positions for configuring a plurality of configurable devices, each one of the plurality of configuration positions having an associated output, the circuit board assembly comprising:

a first plurality of traces, correspondingly coupled to the plurality of strapping devices;

an output port, coupled to the first plurality of traces, to output on the first plurality of traces electrical signals of a first state at a first time and a second state at a second time;

a plurality of input ports, for receiving the associated output from each of the plurality of strapping devices at the first time and second time; and a second plurality of traces each having an associated pull-up resistor tied to a positive voltage level, correspondingly coupling each of the plurality of strapping devices to the plurality of input ports, wherein unconfigured or half functioning ones of the plurality of strapping devices are identified.

12. The circuit board assembly of claim 11, wherein the second plurality of traces correspondingly couples an output of each of the plurality of strapping devices to an input of each of the plurality of configurable devices.

13. The circuit board assembly of claim 12, wherein the input of each of the plurality of configurable devices is biased to a particular logic level with either an internal pull-up resistor or an internal pull-down resistor.

14. The circuit board assembly of claim 11, wherein configuration of each strapping device of the plurality of strapping devices is determined by analyzing the first and second sampled associated outputs, wherein a constant associated output signifies an unconfigured strapping device, while a variable associated output signifies a configured strapping device.

15. The circuit board assembly of claim 14, wherein proper configuration of each functional ones of the plurality of strapping devices is determined by comparing the associated output to system configuration information.

16. A method for testing a circuit board assembly having a plurality of strapping devices for configuring a plurality of configurable devices, an output port and a plurality of input ports, a first plurality of traces each having an associated pull-up resistor, for coupling the plurality of input ports to the plurality of strapping devices, and a second plurality of traces coupling the plurality of strapping devices to the plurality of configurable devices, wherein the strapping devices are selectively configurable into a plurality of configuration positions, each position having an associated output, the method comprising the steps of:

injecting a first signal at a first state at a first time and a second signal at a second state at a second time, through the output port to each of the plurality of strapping devices;

receiving the associated output from each of the plurality of strapping devices at the first time and the second time at the plurality of input ports via the first plurality of traces; and comparing the first received associated output and the second received associated output for each of the plurality of strapping devices, for identifying unconfigured or malfunctioning ones of the plurality of strapping devices.

17. The method of claim 16, wherein a constant associated output detected in the step of comparing signifies an unconfigured strapping device, and a variable associated output detected in the step of comparing signifies a configured strapping device.

* * * * *